(12) United States Patent
Andersson

(10) Patent No.: US 11,332,685 B2
(45) Date of Patent: May 17, 2022

(54) FURNITURE LUBRICANT

(71) Applicant: IKEA SUPPLY AG, Pratteln (CH)

(72) Inventor: Benny Andersson, Almhult (SE)

(73) Assignee: IKEA SUPPLY AG, Prattein (CH)

( * ) Notice: Subject to any disclaimer, the term of this patent is extended or adjusted under 35 U.S.C. 154(b) by 0 days.

(21) Appl. No.: 16/489,812

(22) PCT Filed: Mar. 2, 2018

(86) PCT No.: PCT/SE2018/050200
§ 371 (c)(1),
(2) Date: Aug. 29, 2019

(87) PCT Pub. No.: WO2018/160127
PCT Pub. Date: Sep. 7, 2018

(65) Prior Publication Data
US 2020/0071631 A1 Mar. 5, 2020

(30) Foreign Application Priority Data
Mar. 3, 2017 (SE) .................................... 1750237-8

(51) Int. Cl.
*C10M 101/04* (2006.01)
*B05D 5/08* (2006.01)
(Continued)

(52) U.S. Cl.
CPC ............. *C10M 101/04* (2013.01); *B05D 5/08* (2013.01); *C10M 101/02* (2013.01);
(Continued)

(58) Field of Classification Search
CPC .......................... C10M 101/04; C10M 101/02; C10M 129/20; C10M 2203/024; C10M 2207/40;
(Continued)

(56) References Cited

U.S. PATENT DOCUMENTS

| 1,071,006 A | 8/1913 | Little |
| 2,441,721 A | 5/1948 | Schroeder |

(Continued)

FOREIGN PATENT DOCUMENTS

| CA | 2215925 | 9/1996 |
| CA | 2437147 A1 | 2/2005 |

(Continued)

OTHER PUBLICATIONS

Greenlaw, Wendy: [online] [retrieved on 20:1.6-11-01]. Retrieved from Internets URL: https://www.pinterest.ch/bin/395331673512857041/?lp=true>.

(Continued)

*Primary Examiner* — James C Goloboy
(74) *Attorney, Agent, or Firm* — Renner, Otto, Boisselle & Sklar, LLP

(57) ABSTRACT

A furniture lubricant for coating a linear lacquered furniture slide bar to provide a slide layer with lowered friction. The furniture lubricant comprises a C10 to C28 alkane and a tri-glyceride. The viscosity, according to ISO 3104:1994/COR 1:1997, of the furniture lubricant at 40° C. is 20 to 80 $mm^2/s$.

14 Claims, 2 Drawing Sheets

(51) Int. Cl.
*C10M 101/02* (2006.01)
*C10M 129/20* (2006.01)
*F16C 29/00* (2006.01)
*F16C 29/02* (2006.01)
*C10N 30/02* (2006.01)
*C10N 30/10* (2006.01)

(52) U.S. Cl.
CPC ......... *C10M 129/20* (2013.01); *F16C 29/005* (2013.01); *F16C 29/02* (2013.01); *C10M 2203/024* (2013.01); *C10M 2207/40* (2013.01); *C10N 2030/02* (2013.01); *C10N 2030/10* (2013.01)

(58) Field of Classification Search
CPC ............ C10N 2030/02; C10N 2030/10; F16C 29/005; F16C 29/02; B05D 5/08
See application file for complete search history.

(56) References Cited

U.S. PATENT DOCUMENTS

| | | | |
|---|---|---|---|
| 2,720,316 A | 10/1955 | Glascott | |
| 3,139,313 A | 6/1964 | Rule | |
| 3,221,677 A | 12/1965 | Kerr | |
| 3,622,473 A | 11/1971 | Ohta et al. | |
| 3,755,093 A | 8/1973 | Suematsu | |
| 3,760,744 A | 9/1973 | Cruckshank | |
| 3,916,802 A | 11/1975 | Virtue | |
| 4,036,369 A | 7/1977 | Eisenberg | |
| 4,138,176 A | 2/1979 | Cowdroy | |
| 4,286,525 A | 9/1981 | Willmore | |
| 4,297,952 A | 11/1981 | Zagaroli | |
| 4,500,146 A | 2/1985 | Peterson | |
| 4,637,081 A | 1/1987 | Clark | |
| 4,713,949 A | 12/1987 | Wilcox | |
| 5,064,547 A | 11/1991 | Rubin | |
| 5,085,524 A | 2/1992 | Reiss | |
| 5,101,524 A | 4/1992 | Brandschain | |
| 5,171,622 A | 12/1992 | Wegner | |
| 5,263,384 A | 11/1993 | Suzuki | |
| 5,290,058 A | 3/1994 | Adams et al. | |
| 5,325,732 A | 7/1994 | Vogel | |
| 5,735,610 A | 4/1998 | Mark et al. | |
| 5,981,448 A | 11/1999 | Matsui et al. | |
| 6,004,909 A * | 12/1999 | Lindman | C10M 125/18 508/174 |
| 6,225,404 B1 | 5/2001 | Sorensen et al. | |
| 6,520,092 B2 | 2/2003 | Marshall | |
| 6,822,014 B2 | 11/2004 | Katou | |
| 6,854,402 B2 | 2/2005 | Dubarry | |
| 6,855,676 B2 | 2/2005 | Li | |
| 6,877,826 B2 | 4/2005 | Wood | |
| 7,398,737 B1 | 7/2008 | Martellaro | |
| 7,653,966 B2 | 2/2010 | Quinn | |
| 7,780,254 B2 | 8/2010 | Wang | |
| 7,987,799 B2 | 8/2011 | Lange | |
| 8,418,318 B2 | 4/2013 | Scharf et al. | |
| 10,077,934 B1 | 9/2018 | Dizon | |
| 10,441,069 B2 | 10/2019 | Andersson | |
| 10,844,906 B2 | 11/2020 | Andersson | |
| 2003/0013615 A1 | 1/2003 | Levy | |
| 2003/0176302 A1 | 9/2003 | Li et al. | |
| 2003/0213698 A1 | 11/2003 | Kawagoshi | |
| 2004/0096129 A1 | 5/2004 | Schmalzhofer | |
| 2007/0261198 A1 | 11/2007 | Vogler | |
| 2008/0125338 A1* | 5/2008 | Corbett | C10M 169/00 508/430 |
| 2008/0159671 A1 | 7/2008 | Leonardelli | |
| 2011/0177987 A1 | 7/2011 | Lenting | |
| 2012/0240350 A1 | 9/2012 | Natu et al. | |
| 2014/0157677 A1 | 6/2014 | Walawender et al. | |
| 2014/0255656 A1 | 9/2014 | Suzuki | |
| 2015/0361274 A1 | 12/2015 | Domes | |
| 2016/0106221 A1 | 4/2016 | Gardner | |
| 2016/0319211 A1 | 11/2016 | Barth et al. | |
| 2018/0245389 A1 | 8/2018 | Andersson | |
| 2018/0335078 A1 | 11/2018 | Andersson | |
| 2018/0338615 A1 | 11/2018 | Andersson | |

FOREIGN PATENT DOCUMENTS

| | | | |
|---|---|---|---|
| CH | 334983 A | 12/1958 | |
| CN | 1090593 A | 8/1994 | |
| CN | 1223675 | 7/1999 | |
| CN | 2481814 A | 3/2002 | |
| CN | 1385482 | 12/2002 | |
| CN | 2542785 A | 4/2003 | |
| CN | 101035959 A | 9/2007 | |
| CN | 201079158 A | 7/2008 | |
| CN | 201190490 U | 2/2009 | |
| CN | 201230725 Y | 5/2009 | |
| CN | 201491997 U | 6/2010 | |
| CN | 102307499 A | 1/2012 | |
| CN | 202128137 U | 2/2012 | |
| CN | 202436824 U | 9/2012 | |
| CN | 103555177 A | 2/2014 | |
| CN | 103573075 A | 2/2014 | |
| CN | 103867062 | 6/2014 | |
| CN | 104154118 A | 11/2014 | |
| DE | 1112266 B | 8/1961 | |
| DE | 1954506 | 2/1967 | |
| DE | 3613313 A1 | 10/1987 | |
| DE | 29611949 U1 | 9/1996 | |
| DE | 29813478 U1 | 11/1998 | |
| DE | 19924642 C2 | 5/1999 | |
| DE | 20111930 U1 | 10/2001 | |
| DE | 102011053946 A1 | 3/2013 | |
| EP | 985793 A2 | 3/2000 | |
| EP | 1153560 A2 | 11/2001 | |
| EP | 1568299 B1 | 8/2005 | |
| EP | 1726760 A2 * | 11/2006 | ............ E05D 3/127 |
| EP | 2957784 A1 | 12/2015 | |
| FR | 1467583 A | 1/1967 | |
| GB | 1126855 | 9/1968 | |
| GB | 1383645 A | 2/1974 | |
| GB | 1415100 | 11/1975 | |
| GB | 2386929 A | 10/2003 | |
| JP | 57173666 A | 10/1982 | |
| JP | 576447 A | 3/1993 | |
| JP | H06136304 | 5/1994 | |
| JP | 2003268194 A | 9/2003 | |
| JP | 2005042304 A | 2/2005 | |
| JP | 2006062328 A | 3/2006 | |
| JP | 2006062328 A1 | 3/2006 | |
| SU | 1690664 A1 | 11/1991 | |
| WO | 9424912 A1 | 11/1994 | |
| WO | 9947824 W | 9/1999 | |
| WO | 19999947824 A1 | 9/1999 | |
| WO | 2006022669 A1 | 3/2006 | |
| WO | 2015051892 A1 | 4/2015 | |

OTHER PUBLICATIONS

Loehle, S. et al. "Mixed Lubrication with C18 Fatty Acids: Effect of Unsaturation" In: Tribology Letters, 2014, vol. 53, pp. 319-328; p. 319, col. 2-p. 320, col. 1; p. 323, col. 2.

International Search Report and Written Opinion for corresponding International Application No. PCT/SE2018/050200 dated Dec. 4, 2018.

Štěpek et al. Additives for Plastics, Polymers Properties and Applications 5, Prague and Montreal, Dec. 1982.

Hussein et al., "Enhancement of the Wear Resistance and Microhardness of Aluminum Alloy by Nd:YaG Laser Treatment," The Scientific World Journal, , vol. 2014,Article ID 842062, pp. 1-5.

Table of Aluminum hardnesses—Nov. 29, 2019 (Year:2019).

Roleira, F M F et al., Lipophilic phenolic antioxidants: Correlation between antioxidant profile, partition coefficients and redox properties, Bioorganic & Medicinal Chemistry, Elsevier, ML, vol. 18, No. 16, Aug. 15, 2010, pp. 5816-5825.

(56) References Cited

OTHER PUBLICATIONS

M.J. Furey et al., The Effect of Lubriccant Viscosity on Metallic Contact and Friction in a Sliding System, vol. 5, No. 1, Jan. 1, 1962, pp. 149-159, XP055745398.
Anonymous, Standard Test Method for Total Iodine Value of Drying Oils and Their Derivatives (D 1541-97), withdrawn, Jan. 1, 1997, pp. 1-4, XP055745437, retrieved from the internet: www.astm.org on Oct. 30, 2020.
Anonymous, Regulation (EC) No. 1935/2004 of the European Parliament And of the Council of Oct. 27, 2004 on materials and articles intended to come into contact with food and repealing Directives 80/590/EEC and 89/109/EEC, Official Journal of the European Union, Nov. 13, 2004, pp. 1-14, XP055745458.
Anonymous, Liquid Petroleum or "Russian Mineral Oil", Journal of Pharmaceutical Sciences, vo. 3, No. 7, Jul. 1, 1914, pp. 1013-1018, XP055745484, ISSN: 0898-140X, DOI: 10.1002/jps.3080030718.

* cited by examiner

FURNITURE LUBRICANT

This application is a national phase of International Application No. PCT/SE2018/050200 filed Mar. 2, 2018, and claims priority to Swedish Application No. 1750237-8 filed on Mar. 3, 2017, which are incorporated herein by reference.

FIELD OF THE INVENTION

The present invention relates to a polymer compatible, ageing resistant lipophilic furniture lubricant for coating a lacquered furniture slide bar to provide a slide layer with lowered friction for a plastic furniture sliding member.

BACKGROUND

Linear plain furniture bearings are known in the art and have been used in simple constructions within the home, including sliding doors, e.g. wardrobe doors and kitchen doors, extendable tables, chests of drawers, extendable sofa beds etc. They are relatively simple, reliable constructions, though the dynamic friction typically is fairly high, but still often acceptable. Still it is of interest to provide simple, inexpensive, safe means form for providing plain bearings with lowered friction. The lowered friction should preferably be in principle permanent. Further, the plain bearing should preferably be essentially maintenance-free. Permanent low friction would in addition open up for replacing ball bearings in applications today requiring such for obtaining sufficiently low friction.

In the art, some means for lowering the friction of plain bearings for simple constructions within the home are known. These include the provision of various kinds of inserts and coatings (cf. e.g. CH 334 983) and combinations of different materials (cf. e.g. U.S. Pat. No. 4,138,176). Though lubricants commonly are used in industrial applications, especially for metal-metal interfaces, they have found in principle no use in simple constructions within the home, as they typically require maintenance and repeated application of the lubricant among other reasons. Further, the safety requirements are significantly different between industrial applications on the one hand, and home applications of the other.

It should further be noted that the coefficient of friction should preferably be really low, i.e. <0.1, preferably less than 0.075, or even less than 0.06, to find use in simple constructions within the home to replace ball bearings.

Thus, there is a need in the art for furniture lubricant for plain bearings for simple constructions within the home providing maintenance-free, long term low dynamic friction, and dispensing with the need for repeated application of the lubricant. The furniture lubricant should be inexpensive and safe, to allow for repeated direct contact by man including children.

SUMMARY

Consequently, the present invention seeks to mitigate, alleviate, eliminate or circumvent one or more of the above identified deficiencies and disadvantages in the art singly or in any combination by providing a furniture lubricant comprising a C10 to C28 alkane and a tri-glyceride. The viscosity, according to ISO 3104:1994/COR 1:1997, of the lubricant at 40° C. should be 20 to 80 mm$^2$/s.

A viscosity of above 80 mm$^2$/s, at 40° C. pursuant to ISO 3104:1994/COR 1:1997, tends to increase the friction, and in addition makes it more difficult to apply the furniture lubricant to a piece of furniture. Preferably, the viscosity should be less than 70 mm$^2$/s, at 40° C., for even lower friction.

A viscosity of less than 20 mm$^2$/s, at 40° C. pursuant to ISO 3104:1994/COR 1:1997, tends to give an increased friction in furniture applications. In addition, the furniture lubricant tends to lose its low friction properties faster, and thereby result in a short life of the furniture to which it is applied. Preferably, the viscosity should be at least 30 mm$^2$/s, at 40° C., for even better durability.

It has been found that really low dynamic friction may be provided by providing a plain bearing comprising lacquered furniture slide bar being coated with such a furniture lubricant to provide a slide layer with lowered friction and least one plastic furniture sliding member sliding over the slide layer. The interface between the slide layer of the furniture slide bar and the plastic furniture sliding member forms a linear plain bearing and allows for linear movement of the furniture sliding member along the furniture slide bar. The furniture slide bar has a slide surface coated with a lacquer comprising a resin.

According to one embodiment, at least the slide surface of the furniture slide bar may be an aluminum surface. This provides for an efficient support for the lacquer coated on the slide surface. The aluminum surface may have an anodized oxide surface layer onto which the lacquer is applied. Anodized surfaces are hard and provide for good adhesion of the lacquer applied thereto. The furniture slide bar may be an aluminum bar, e.g. aluminum profile, preferably having an anodized oxide surface layer, onto which the lacquer is applied. As an example, the slide member may be an aluminum profile having been electrophoretically, preferably anaphoretically, coated with an acrylic resin and subsequently heat cured to form the lacquer coated on the slide surface. Preferably, the aluminum profile has an anodized oxide surface layer onto which the lacquer is applied. The Honny process or one of its derivatives may be used to obtain such anodized, lacquered surfaces. Whereas the thickness of the anodized oxide surface layer preferably is at least 5 micrometers, the thickness of the lacquer coated on the furniture slide bar may preferably be 100 micrometers or less. Further, according to another embodiment the slide surface of the slide member is made from steel, onto which the lacquer is applied. Steel is a generally strong, hard and comparably cheap material that can be used as a starting material for the slide member. Steel surfaces may be lacquered by electrocoating or autodeposition to provide a lacquer layer with uniform thickness. The part of the plastic furniture sliding member to slide over the slide layer may be configured as a blade extending in the sliding direction. Further, the slide layer may be present at a track, such as in a groove or on a ridge, extending along the longitudinal axis of the furniture slide bar. The sliding member comprises at least one individual contact point in contact with the furniture slide bar at the interface between the furniture slide bar and the sliding member. The contact area of each individual contact point may be less than 3 mm$^2$. Further, the contact pressure in the at least one contact point may be at least 4 N/mm$^2$.

It has surprisingly been found that coating a surface lacquered with a resin, for example an acrylic resin, with a lipophilic composition, such as for example sebum (natural or artificial), coconut oil, or liquid paraffin, provides a slide layer with extremely low friction (sliding resistance). While the initial sliding resistance is low for the combination of a lacquered furniture slide bar and a plastic furniture sliding member also without application of a lubricant, such a bearing was found to seize only after a limited number of sliding cycles. Application of the lipophilic composition reduced the dynamic friction (up to 75%). Surprisingly, the effect was not only temporarily, but seemingly permanent or at least long-lasting. The need to replenish the lubricant may hence be dispensed with.

In experiments employing aluminum profiles having been anaphoretically coated with an acrylic resin subsequently heat cured to form a lacquer (cf. the Honny process, initially disclosed in GB 1,126,855), wherein the lacquer of the aluminum profiles was coated with sebum, the friction remained nearly the same after more than 70,000 test cycles of a sliding door being reciprocated along the profile. So many cycles by far exceed the expected number on lifetime cycles. Further, washing the coated aluminum profile with water/detergent, ethanol, and/or iso-propanol did not significantly affect the friction. Without being bond to any theory, it seems that the sebum coating provides an irreversibly bound lubricant coating on top of the lacquer comprising the acrylic resin. Further, the lacquer seems to be important in providing low friction.

Various lipophilic compositions may be used to lower the friction of plain bearings comprising lacquered furniture slide bar and a plastic furniture sliding member. However, for long term use in simple constructions within the home, a furniture lubricant comprising a C10 to C28 alkane, such as C10 to C18 alkane, and a tri-glyceride and having a viscosity, according to ISO 3104:1994/COR 1:1997, of the lubricant at 40° C. being 20 to 80 mm$^2$/s is advantageous.

Such a furniture lubricant provides a combination of preferred properties including low friction, ageing resistance, food safety, manageability (i.e. the lubricant is suitable for application in an industrial production line for producing furniture) and resistance to wear. An example of a suitable furniture lubricant, is a composition comprising a mixture of liquid paraffin and a biologically derived triglyceride composition, e.g. coconut oil, in which the liquid paraffin is preferably the major component (>50 wt. %). Though coconut oil provides very low friction initially and has high resistance to wear, the friction increases over time. Further, coconut oil is solid (or semi-solid) at ambient temperature. From a food safety perspective, coconut oil is a very good triglyceride composition, as it is a foodstuff with essentially no food safety concerns.

Given the low friction of triglycerides and their other beneficial properties in the present application including food safety, the present lubricant comprises as least one tri-glyceride. The furniture lubricant may comprise a mixture of different tri-glycerides, i.e. at least two tri-glycerides, such as at least 3, 4, or 5 different tri-glycerides. Further, the composition may comprise 1 to 50 wt. % of a tri-glyceride, such as 5 to 40 wt. % or 10 to 30 wt. % of a tri-glyceride. As already mentioned, the furniture lubricant may comprise a mixture of different tri-glycerides, i.e. at least two triglycerides. Thus, the furniture lubricant may comprise at least 5 wt. % of a mixture of different tri-glycerides, such as at least 10 wt. % of a mixture of different tri-glycerides, such as 5 to 40 wt. %, or even 10 to 30 wt. % of a mixture of different tri-glycerides. According to an embodiment, the furniture lubricant comprises a biologically derived triglyceride composition, e.g. coconut oil. In terms of ageing resistance, coconut oil is preferred over alternative biologically derived triglyceride compositions having higher content of unsaturated fatty acids. Biologically derived triglyceride compositions having a Total Iodine Value according to ASTM D1541-97 of less than 50, such as less than 20, represent preferred biologically derived triglyceride compositions for being included in the present furniture lubricant.

In order to be suitable for application in an industrial production line but still sufficiently resistant to wear and give the desired low friction properties over time, the furniture lubricant has a viscosity, according to ISO 3104: 1994/COR 1:1997, at 40° C. of 20 to 80 mm$^2$/s, such as of 30 to 70 mm$^2$/s.

The viscosity of a lubricant comprising a tri-glyceride is affected by including a C10 to C28 alkane in the composition. Further, in contrast to tri-glycerides, alkanes are more ageing resistant. They do provide low friction, but not as low as tri-glycerides. Further, mixtures of alkanes do seemingly provide lower friction than an individual alkane. Thus, the furniture lubricant may comprise a mixture of at least two different C10 to C28 to alkanes. Liquid paraffin is an example of a preferred mixture of alkanes having suitable properties. According to an embodiment, the furniture lubricant comprises n-alkanes, branched alkanes, and optionally also cycloalkanes.

By providing a mixture of a C10 to C28 alkane, such as a C10 to C18 alkane, and tri-glyceride, a more ageing resistant furniture lubricant still providing low friction and having good manageability and resistance to wear is provided.

The furniture lubricant may comprise at least 50 wt. % of a C10 to C28 alkane, such as at least 60 wt. % of a C10 to C28 alkane, or a at least 70 wt. % of a C10 to C28 alkane. As already mentioned, the furniture lubricant may comprise a mixture of different C10 to C28 alkanes, i.e. at least two C10 to C28 alkanes. Thus, the furniture lubricant may comprise at least 50 wt. % of a mixture of different C10 to C28 alkanes, such as at least 60 wt. % of a mixture of different C10 to C28 alkanes, or at least 70 wt. % of a mixture of different C10 to C28 alkanes. The mixture of different C10 to C28 alkanes may comprise more than 2 different C10 to C28 alkanes, such as at least 3, at least 4, or at least 5 different C10 to C28 alkanes.

According to an embodiment, the C10 to C28 alkane is an n-alkane. If the major C10 to C28 alkane is an n-alkane, the furniture lubricant may further comprise minor amounts of branched alkanes and/or cycloalkanes. Seemingly, not only the friction but also the resistance to wear is improved by a tri-glyceride being present in the furniture lubricant.

As used herein, alkanes include n-alkanes and branched alkanes. If an integer, e.g. C10, used as prefix, the integer represent the carbon number of the alkanes. As an example, C16 alkane corresponds to hexadecane, whether straight, branched or cyclic. Further, "C10-16 alkane" represents an alkane having a carbon number in the range of 10 (e.g. decane) to 16 (e.g. hexadecane)

According to an embodiment the furniture lubricant:
has a viscosity according to ISO 3104:1994/COR 1:1997, at 40° C., of 20 to 80 mm$^2$/s, such as 30-70 mm$^2$/s;
comprises at least 50 wt. %, such as at least 60 wt. % or at least 70 wt. %, of one or more C10 to C28 alkanes, such as a n-alkane; and
comprises 1 to 50 wt. %, such as 5 to 40 wt. %, or 10 to 30 wt. %, of one or more triglycerides.

According to a specific embodiment the furniture lubricant:
has a viscosity according to ISO 3104:1994/COR 1:1997, at 40° C., of 20 to 80 mm$^2$/s, such as 30 to 70 mm$^2$/s;
comprises at least 50 wt. %, such as at least 60 wt. % or at least 70 wt. %, of a mixture of alkanes, such as liquid paraffin; and comprises 1 to 50 wt. %, such as 5 to 40 wt. %, or 10 to 30 wt. %, of a biologically derived triglyceride composition, e.g. coconut oil. In such an embodiment, the liquid paraffin may have a viscosity, according to ISO 3104:1994/COR 1:1997, at 40° C., of 20 to 80 mm$^2$/s, such as 30 to 70 mm$^2$/s.

Further, in order to not be potentially harmful, the content of aromatics, i.e. compounds comprising benzene rings or fused benzene rings, in the furniture lubricant is low. According to an embodiment, the furniture lubricant comprises less than 5 wt. % aromatics, such as less than 2.5 wt. % aromatics, less than 1.0 wt. % aromatics or less than 0.1 wt. % aromatics.

Furthermore, it was found that unsaturated components may affect the ageing resistance of the furniture lubricant negatively though typically lowering the viscosity. As recognized by the skilled person, the content of carbon-carbon double bonds in an organic sample may be determined by determining the Total Iodine Value. The Total Iodine Value (also known as "iodine adsorption value", "iodine number" or "iodine index") is the mass of iodine in grams that is consumed by 100 grams of a chemical substance. The Total Iodine Value is used to determine the amount of unsaturation in e.g. fatty acids and tri-glycerides. The higher the iodine number, the more carbon-carbon double bonds are present. According to an embodiment, the furniture lubricant has a Total Iodine Value according to ASTM D1541-97 of less than 10, such as less than 5.

As already discussed, the viscosity of the furniture lubricant at 40° C. according to ISO 3104:1994/COR 1:1997 should be 20 to 80 mm$^2$/s. However, not only the viscosity is relevant for the manageability of the furniture lubricant, but also other related parameters, such as the melting point and pour point. According to an embodiment, the furniture lubricant is present in liquid form at least at temperatures of 15° C. and above. Further, the pour point of the furniture lubricant according to ISO 3016:1994 may be 20° C. or less, such as 15° C. or less. As recognized by the skilled person, the pour point of a liquid is the temperature at which the liquid becomes semi solid and loses its flow characteristics. The pour point is thus relevant for the manageability of the present furniture lubricant.

Further, given that the furniture lubricant is to be used in constructions within the home to which also children and infants may have access, all components in the furniture lubricant are, according to an embodiment, generally recognized as safe (GRAS) in the US 31 Dec. 2016. As recognized by the skilled person, "GRAS" is an acronym for the phrase Generally Recognized As Safe. Under sections 201(s) and 409 of the Federal Food, Drug, and Cosmetic Act (the Act), any substance that is intentionally added to food is a food additive, that is subject to premarket review and approval by FDA (American Food and Drug Administration), unless the substance is generally recognized, among qualified experts, as having been adequately shown to be safe under the conditions of its intended use, or unless the use of the substance is otherwise excepted from the definition of a food additive. Under sections 201(s) and 409 of the Act, and FDA's implementing regulations in 21 CFR 170.3 and 21 CFR 170.30, the use of a food substance may be GRAS either through scientific procedures or, for a substance used in food before 1958. Especially, it is preferred if at least the tri-glyceride is generally recognized as safe (GRAS) in the US 31 Dec. 2016. As recognized by the skilled person, an inventory of GRAS notices is provided by the FDA. The inventory of GRAS notices provides information about GRAS notices filed.

Apart from GRAS also other classification standards may serve as guidance in selecting components for the furniture lubricant.

NSF International (cf. http://www.nsf.org) is an independent, well reputed third part organization founded in 1944 as the National Sanitation Foundation. NSF runs a nonfood compounds program to evaluate the risk of contamination of chemical compounds used in and around food processing facilities. Products eligible for registration include lubricants, cleaners, and water treatment products. Nonfood compounds and proprietary substances found compliant to food safety regulations after a thorough registration process are listed in the NSF White Book™. The NSF White Book™ comprises products listed under various categories and is recognized internationally and used by product manufacturers, food processors and regulators. According to an embodiment, the C10-C28 alkane, or a mixture comprising such an alkane, was classified as a H1 lubricant by NSF on 31 Dec. 2016. H1 classified lubricants are lubricants that could have incidental food contact and are sometimes referred to as "above the line" lubricants. These may be used on food-processing equipment as a protective antirust film, as a release agent on gaskets or seals of tank closures, and as a lubricant for machine parts and equipment in locations where the lubricated part is potentially exposed to food.

According to another embodiment, the C10-C28 alkane, or a mixture comprising such an alkane, was approved for contact with food according to the EU Regulation (EC) No 1935/2004 on 31 Dec. 2016.

Thus, according to an embodiment, each of the components in the furniture lubricant (18) at least fulfill one of the following criteria:
  was generally recognized as safe (GRAS) in the US on Dec. 31, 2016;
  was classified as a H1 lubricant by NSF on 31 Dec. 2016; and
  was approved for contact with food according to the EU Regulation (EC) No 1935/2004 on 31 Dec. 2016.

As already discussed, the ageing resistance of tri-glycerides was found to be fairly low, i.e. use of only tri-glycerides as the furniture lubricant in the present plain bearings results in increased friction over time, although the initial friction is very low. By combining tri-glycerides and C10 to C18 alkane, the ageing resistance is improved.

In order to further improve the ageing resistance, an anti-oxidant may be present in the furniture lubricant. Thus, the furniture lubricant may comprise an anti-oxidant. The furniture lubricant may according to such an embodiment comprise up to 5 wt. % of the anti-oxidant, such as up to 2.5 wt. % of the anti-oxidant, e.g. 0.1 to 1 wt. % of the anti-oxidant. Preferably, the anti-oxidant was permitted to be used as food additives within the European Union on 31 Dec. 2016, i.e. an anti-oxidant having an E number. Thus, the anti-oxidant may be selected from the group consisting of E300 Ascorbic acid (Vitamin C), E301 Sodium ascorbate, E302 Calcium ascorbate, E303 Potassium ascorbate, E304 Fatty acid esters of ascorbic acid (Ascorbyl palmitate), E305 Ascorbyl stearate, E306 Tocopherols (Vitamin E, natural), E307 Alpha-Tocopherol (synthetic) antioxidant, E308 Gamma-Tocopherol (synthetic), E309 Delta-Tocopherol (synthetic), E310 Propyl gallate, E311 Octyl gallate, E312 Dodecyl gallate, E313 Ethyl gallate, E314 Guaiac resin, E315 Erythorbic acid, E316 Sodium erythorbate, E317 Erythorbin acid. E318 Sodium erythorbin, E319 tert-Butyl-hydroquinone (TBHQ), E320 Butylated hydroxyanisole (BHA), E321 Butylated hydroxytoluene (BHT), E323 Anoxomer, and E324 Ethoxyquin. As the anti-oxidant is to be used in a lipophilic lubricant, the anti-oxidant preferably is lipophilic. The partition-coefficient between n-octanol and water is a common measure of lipophilicity. Thus, the anti-oxidant may have log P (n-octanol/water) of at least 1 at 25° C.

As an example, the anti-oxidant may be a tocopherol, e.g. (±)-α-tocopherol. Apart from alfa-tocopherol (E307), also gamma-tocopherol (E308), and delta-tocopherol (E308) may be used as anti-oxidant. Further, the anti-oxidant may be natural Vitamin E (E306). Given the safety concerns, tocopherol, e.g. alfa-tocopherol (E307), is a preferred anti-oxidant in the present furniture lubricant. Further, the anti-oxidant may be selected from the group not only consisting of tocopherols, e.g. (±)-α-tocopherol, but also of sterically hindered phenols, e.g. dibutylhydroxytoluene (BHT) or butylated hydroxyanisole (BHA) (i.e. 2-tert-butyl-4-hydroxyanisole and/or 3-tert-butyl-4-hydroxyanisole).

BRIEF DESCRIPTION OF THE DRAWINGS

The above and other aspects, features and advantages of which the invention is capable of will be apparent and elucidated from the following description of the present invention, reference being made to the accompanying drawings, in which.

DETAILED EMBODIMENTS

Figure 1:
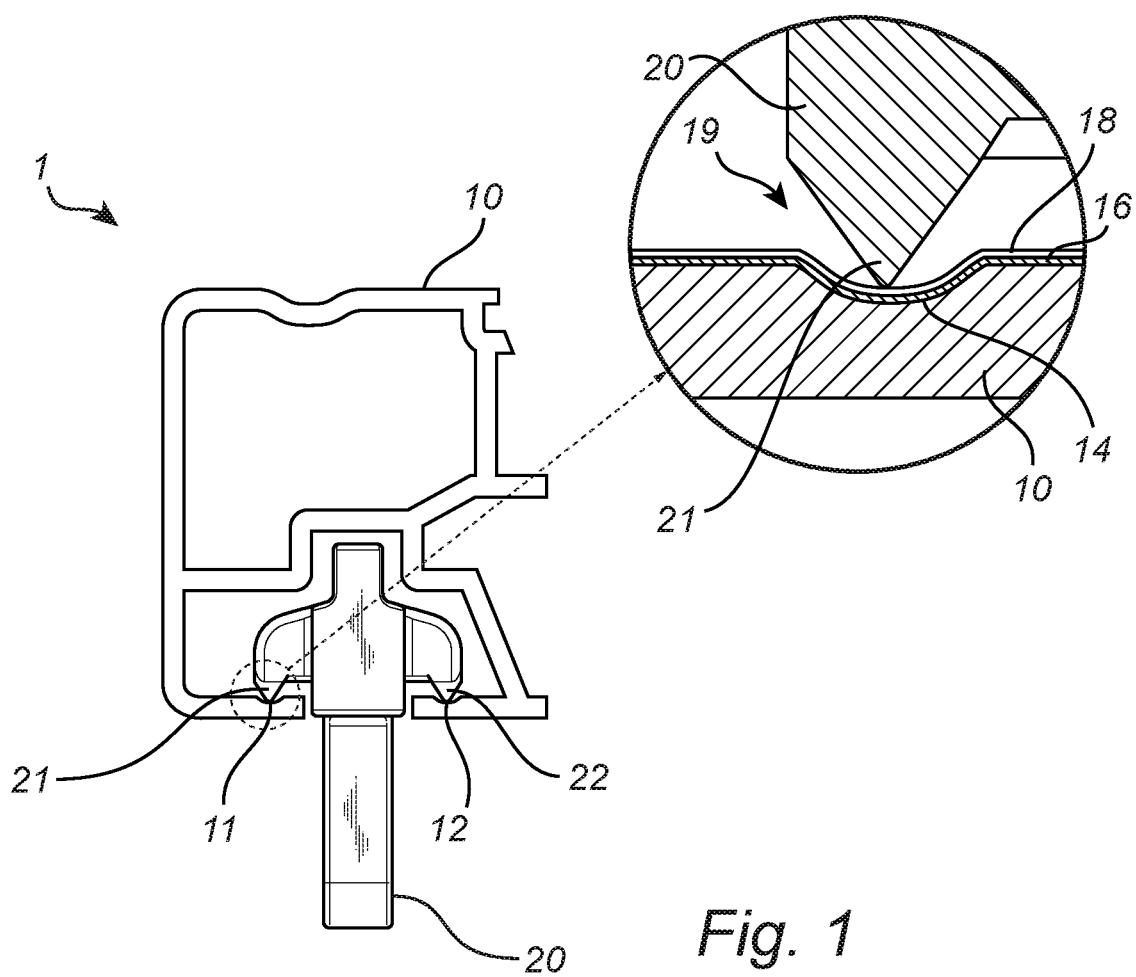
FIG. 1 depicts a cross section of a sliding system in which the present lubricant may be used.

As described herein above, the present furniture lubricant 18 is useful for coating a furniture slide bar 10, having a slide surface 14 coated with a lacquer comprising a resin 16 (cf. FIG. 1). The lacquer is in turn at least partly coated with the furniture lubricant 18 to provide a slide layer 19 with lowered friction. By coating the lacquer with the furniture lubricant 18, the sliding friction is not just temporarily lowered, but long term, wear resistant low sliding friction is obtained. The lubricating coating may be permanent, dispensing with the need to replenish the lubricating coating. Further, very low amounts of the furniture lubricant 18 are needed to provide lowered friction. Thus, contamination of the lubricating coating does not pose any pronounced problem, as the lubricating coating, due to the very low amount present, does not have substantial adhesive properties. This is in contrast to the normal use of lubricants in plain bearings. Further, exposure to contaminations, e.g. dust etc., has been shown not to affect the lowered friction. Neither is the lubricating coating sensitive to washing. Wiping the furniture slide bar 10, with a dry and/or wet cloth, does not affect the lowered friction.

The present furniture lubricant 18 provides an advantageous lubricant for use on lacquered furniture slide bars 10. Lacquered furniture slide bars 10 are useful in systems for sliding wardrobe doors, extendable tables, drawers of chests of drawers, hanging curtains, and similar applications as has been described in the co-pending applications PCT/SE2016/050835, PCT/EP2016/071065, PCT/EP2016/071104, PCT/EP2016/071059, and PCT/SE2016/050837. The therein described sliding systems may be further improved by the present furniture lubricant 18.

In order to provide a sliding system 1, at a least one plastic furniture sliding member 20 is arranged in sliding contact with the furniture slide bar 10. By arranging the interface between slide layer 19 of the furniture slide bar 10 and the sliding member in sliding contact a linear plain bearing is provided. The plastic furniture sliding member 20 is arranged to allow for linear movement of the sliding member in sliding over the slide layer 19 along the longitudinal axis of the linear slide bar 10. Further, the furniture slide bar 10 may be provided with a track, which in this embodiment has the form of a groove 11 extending along the longitudinal axis of the furniture slide bar 10 and defining a slide direction along the longitudinal axis of the furniture slide bar 10. When the furniture slide bar 10 is provided with a groove 11, the slide layer 19 is present at least in the groove 11.

The track, which may for example have the form of a groove, an example of such a groove 11 is illustrated in FIG. 1, or the form of a ridge, improves the control of the lateral position of the sliding member 20 in relation to the furniture slide bar 10 when the sliding member 20 slides along the furniture slide bar 10.

An enlarged detail in FIG. 1 illustrates how the furniture slide bar 10, which is made from, in this embodiment, aluminum, has a slide surface 14. The slide surface 14 is coated with the lacquer comprising a resin 16. The lacquer comprising a resin 16 is in turn coated with the furniture lubricant 18. Thereby a slide layer 19 is formed. The plastic furniture sliding member 20 may slide over this slide layer 19 at a very low friction.

Figure 2:
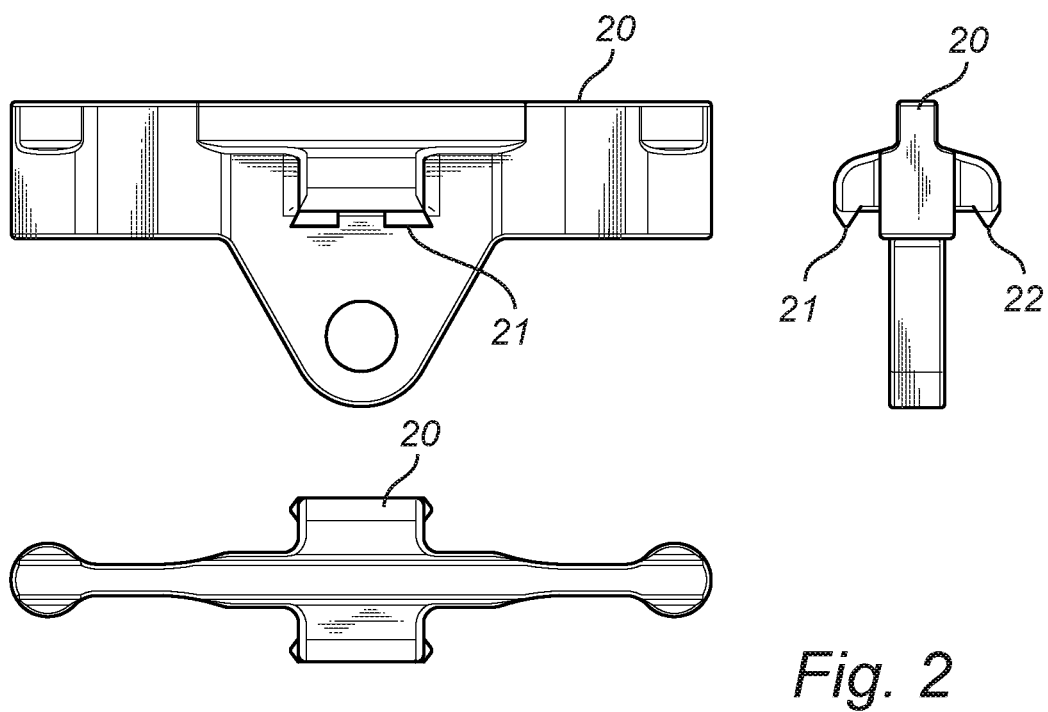
FIG. 2 depicts cross sections of the sliding member in FIG. 1.

Further, as shown in FIG. 2, the part of the plastic furniture sliding member 20 arranged in contact with the slide layer 19 may be configured as a blade 21 extending in the sliding direction. It was surprisingly found that decreasing the contact area at the interface between the furniture slide bar 10 and the plastic furniture sliding member 20 reduced the friction. Normally the risk for the bearing seizing typically increases with reduced contact area. Unless the furniture lubricant 18 is provided, the sliding system 1 will indeed seize within a few sliding cycles.

Such a low amount of the furniture lubricant 18 is needed, that the furniture lubricant 18 may be applied to the plastic furniture sliding member 20 rather than to the furniture slide bar 10. In sliding over the furniture slide bar 10, the furniture lubricant 18 will be transferred to the furniture slide bar 10 to provide a lipophilic composition coating thereon. Hence, the furniture lubricant 18 could be applied to the furniture slide bar 10, to the plastic furniture sliding member 20, or both.

While the furniture slide bar 10 preferably is a metal member, according to one preferred embodiment the furniture slide bar 10 is an aluminum member, e.g. a linear aluminum profile, with an aluminum oxide layer, also other materials coated with a lacquer comprising a resin may be considered, such as steel. In order to allow for long term use and to carry loads, the slide member is typically made from a hard material, such as metal or glass. Especially the surface of the slide member should preferably be hard. The Vickers hardness of the material from which the slide member is made, may be at least 50 MPa, preferably at least 100 MPa, more preferably at least 150 MPa, and most preferably at least 300 MPa. According to an embodiment, the furniture slide bar is a metal bar, such as an aluminum bar or a steel bar. In such embodiment, the bar is made of a metal. While it is preferred if an aluminum bar has an oxide layer, also a raw, i.e. not oxidized, lacquered aluminum bar may be used.

It is however preferred if the surface of the aluminum bar is oxidized to provide the aluminum bar with a hard oxide surface layer.

The furniture slide bar 10 may be an aluminum member. Further, the surface of the aluminum member coated with the lacquer may be an aluminum oxide layer. The thickness of such oxide layer may be at least 5 micrometers, more preferably at least 10 micrometers. Further, the thickness of the oxide layer may be less than 250 micrometers, such as less than 100 micrometers or less than 50 micrometers. As known in the art, the durability and hardness of the surface of aluminum profiles may be improved by oxidation due to the properties of aluminum oxide. The oxide layer initially provided by anodically oxidation is porous. While the pores may be closed by steam treatment, sealing via anaphoretically coating with an acrylic resin subsequently heat cured to form the lacquer, is even more effective in sealing the porous aluminum oxide layer: This method, firstly disclosed by Honny Chemicals Co. Ltd. (cf. GB 1,126,855), is often referred to as the Honny process.

Further, compared to plastic slide bars, a hard, stiff bar, such as aluminum or steel bar, may accept far more heavy loads and still provide low friction. The present slide bar 10 may thus also be used for sliding drawers.

In addition, it has been found that a relatively high contact pressure in the contact between the furniture slide bar 10 and the plastic furniture sliding member 20 reduces the friction. For this reason as well it is beneficial to make the furniture slide bar 10 from a hard material, such as aluminum or steel, since such materials can accept higher contact pressures, thereby reducing friction. In order to just not initially provide low friction, but provide long term low friction, the presence of the present furniture lubricant 18 on the slide layer 19 is important.

As known in the art, various resins, e.g. thermosetting resins, may be used to lacquer aluminum bars and other bars, i.e. to form a lacquer on aluminum bars and other bars. Further, thermosetting resins may also be used to lacquer other metal members, e.g. a metal member made of steel. The lacquer comprises a resin. As known to the skilled person, a lacquer is a hard, thin coating. The resin of the lacquer may for this application preferably comprise polar groups, such as hydroxyl groups, carboxylic acid groups, amide groups, cyano groups (nitrile groups), halide groups, sulfide groups, carbamate group, aldehyde groups, and/or ketone groups. Further may the resin of the lacquer be a thermosetting resin.

Examples of resins for lacquering metal comprise acrylic resins and polyurethane resins. According to an embodiment, the resin is an acrylic resin, such as an acrylate resin, an acrylamide resin, a methacrylate resin, or a methyl methacrylate resin, and mixtures thereof. According to another embodiment, the resin is a polyurethane resin. The acrylic resin may be a thermosetting resin.

As known to the skilled person further resins for use in lacquering metal surfaces are known in the art. As an example, the resin of the lacquer may be selected from the group consisting of cationic epoxy electrocoat, epoxy and polyester resins, and polyester resins. Still further, lacquers adapted for autodeposition coating, such as Autophoretic™ coatings (e.g. Aquence™ Autophoretic® 866™ and BONDERITE® M-PP 930™, the latter being an epoxy-acrylic urethane) available from Henkel AG, DE, may also be used in lacquering surfaces comprising iron.

The slide surface 14 may be lacquered by electrocoating involving dipping the furniture slide bar 10 into a bath containing the lacquer and applying an electric field to deposit lacquer onto the slide member acting as one of the electrodes. Further, the lacquer may be provided in powder form or in liquid form. Both powder and liquid lacquers may be sprayed onto the slide surface 14 to coat it. For powder lacquers, electro static coating may be used. For liquid lacquers a wet spray application or application in a bath may be used. Further, liquid lacquers in a bath may apart from electrocoating be applied by autodeposition.

In order to provide low friction, the thickness of the lacquer should be as even as possible. Thus it may be preferred to apply the lacquer by an electrocoating process, e.g. anaphoretic coating (cf. the Honny method) or cataphoretic coating, providing very even coatings. There are two types of electrocoating, i.e. anodic and cathodic electrocoating. Whereas the anodic process was the first to be developed commercially, the cathodic process is nowadays more widely used. In the anodic process, a negatively charged material is deposited on the positively charged component constituting the anode. In the cathodic process, positively charged material is deposited on the negatively charged component constituting the cathode. In the art, cathodic electrocoating is also known as cathodic dip painting (CDP), cathodic dip coating, cataphoretic coating, cataphoresis and cathodic electrodeposition. Further, the electrocoating process may also be referred to by the trade names of the bath material used. Examples include Cathoguard (BASF), Cor-Max (Du Pont), Powercron (PPG) and Freiotherm (PPG). Further, also electrostatically coating by powder lacquers or autodepostion in a bath provide even coatings and may thus be used.

In lacquering steel surfaces, autodeposition may be used. As recognized by the skilled person, one of the important steps in autodeposition is the coating bath itself, where water-based paint emulsion at low solids (usually around 4-8% by weight) is combined with two other products. A "starter" solution of acidified ferric ($Fe^{3+}$) fluoride initiates the coating reaction and an oxidizing product stabilizes the metal ions in the solution. The coating emulsion is stable in the presence of ferric ions, but unstable in the presence of ferrous ions ($Fe^{2+}$). Therefore, if ferrous ions are liberated from the metal substrate, localized paint deposition will occur on the surface. Immersion of a component made from ferrous metal (e.g. steel) into an autodeposition bath causes the acidic environment to liberate ferrous ions, thereby causing the coating emulsion to be deposited, forming a mono-layer of paint particles. Henkel Adhesive Technologies (US)//Henkel AG & Co. KGaA (Germany) provides coatings under the trademark BONDERITE® for use in autodeposition.

As the lacquer coated on the furniture slide bar 10 typically is more compressible than the material of the furniture slide bar 10 itself, and as load carrying sliding members will apply pressure on the lacquer in sliding over the furniture slide bar 10, the thickness of the lacquer preferably is to be kept thin to reduce compression of it. Compressing the lacquer may negatively affect the sliding resistance; especially at the start of the sliding sequence, i.e. when the sliding member starts to move along the furniture slide bar 10 from a previous state of being at rest.

According to an embodiment, the thickness of the lacquer coated on the slide slide bar 10 is thus 100 μm or less, preferably 75 μm or less, more preferably 50 μm or less. Further, the thickness of the lacquer coated on the slide member, e.g. the furniture slide bar 10, may be 5 to 75 min, such as 10 to 50 min, or 15 to 40 min. Layers of these thicknesses have been found to provide for efficient sliding behavior, also at the instance when the sliding member starts to move along the furniture slide bar 10.

Not only the low dynamic friction provided by the present slide member, but also the low difference between the static and dynamic friction provided by the present slide member is beneficial in terms of the sliding behavior.

In order to provide low friction, at least the part of the plastic furniture sliding member 20 in contact with the slide layer 19 is made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups.

The polymer may be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE).

Further, not only the part of the plastic furniture sliding member 20 in contact with the slide layer 19 may be made of a polymer, but the entire plastic furniture sliding member 20. Thus, the plastic furniture sliding member 20 may be made from a plastic comprising a polymer. As recognized by the skilled person, the plastic may further comprise other additives, such as fillers, colorants, and/or plasticizers. Further, the plastic furniture sliding member 20 may be made from a composite comprising a polymer, such as one of the above listed polymers, filled with particles and/or fibers. The particles and/or fibers will increase the hardness, the stiffness, the creep resistance and elongation (compression) at yield of the plastic furniture sliding member 20. While not affecting the friction, presence of particles and/or fibers may affect the wear. Thus, use of particles and/or fibers in the plastic is less preferred. The furniture lubricant 18 should be compatible with the plastic furniture sliding member 20 as well as with the lacquer 16. Hence, the constituents in the furniture lubricant 18 should preferably be substances that are substantially non-deteriorating to the mechanical properties of the plastic furniture sliding member 20 as well as to the lacquer 16.

According to an embodiment (cf. FIG. 2) the sliding member 20 may be provided with two parallel, displaced blades 21, 22 in order to prevent rotation along the sliding axis. Further, the furniture slide bar 10 may be provided with two parallel grooves 11, 12 arranged along each side of its longitudinal sliding axis. Parallel grooves 11, 12 will support and guide such two parallel blades 21, 22 of the sliding member (cf. FIG. 1).

As already elaborated, the furniture slide bar 10, is, at least partly, coated with the present furniture lubricant 18 to provide a slide layer 19.

The present furniture lubricant 18 comprises a C10 to C28 alkane and a tri-glyceride. The tri-glyceride may be a triglyceride comprising C6 to C40, such as C8 to C28, non-aromatic hydrocarbyl groups.

As known to the skilled person and as recognized in IUPAC's gold book (International Union of Pure and Applied Chemistry, Compendium of Chemical Terminology—Gold Book, Version 2.3.3 of 2014 Feb. 24):

hydrocarbon denotes compounds consisting of carbon and hydrogen only;

hydrocarbyl denotes univalent groups formed by removing a hydrogen atom from a hydrocarbon;

alkane denotes acyclic branched or unbranched hydrocarbons having the general formula $C_nH_{2n+2}$;

cyclo-alkane denotes saturated monocyclic hydrocarbons (with or without side chains, i.e. alkyl groups), e.g. cyclobutane alkene denotes acyclic branched or unbranched hydrocarbons having one or more carbon-carbon double bond(s);

alkyl denotes a univalent group derived from alkanes by removal of a hydrogen atom from any carbon atom —$C_nH_{2n+1}$;

fatty acid denotes an aliphatic monocarboxylic acid;

triglyceride denotes an ester of glycerol (propane-1,2,3-triol) with three fatty acids (tri-O-acylglycerol); and non-aromatic denotes a compound not comprising any cyclically conjugated molecular entity with increased stability due to delocalization.

Triglycerides to be present in the furniture lubricant 18 may include triglycerides which are to at least 90%. wt. composed of a glycerol residue and 3 residues of caproic acid, caprylic acid, capric acid, lauric acid, myristic acid, palmitic acid, stearic acid, and/or arachidic acid, such as 3 residues of lauric acid, myristic acid, palmitic acid, and/or stearic acid. According to an embodiment, the furniture lubricant comprises a biologically derived triglyceride composition such as coconut oil. Coconut oil comprises triglycerides composed of fatty acids that are to a high degree saturated fatty acids. The coconut oil may be hydrogenated to various degrees to further reduce the amount of unsaturated fatty acids residues.

As already mentioned, the furniture lubricant 18 comprises C10 to C28 alkanes, such as C10 to C18 alkanes. As an example, the furniture lubricant may thus comprise mineral oil, such as at least 50 wt. %, such as at least 60 wt. %, or at least 70 wt. % mineral oil. Mineral oil is a colorless, odorless, light mixture of higher alkanes from a non-vegetable (mineral) source. Further, the furniture lubricant 18 may comprise mineral oil of the type referred to as liquid paraffin, such as at least 50 wt. %, such as at least 60 wt. %, or at least 90 wt. % liquid paraffin. Liquid paraffin, also known as paraffinum liquidum, is a very highly refined mineral oil used in cosmetics and for medical purposes. A preferred form is the liquid paraffin having CAS number 8012-95-1.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than those specifically described above are equally possible within the scope of these appended claims, e.g. different embodiments than those described above.

In the claims, the term "comprises/comprising" does not exclude the presence of other elements or steps. Additionally, although individual features may be included in different claims, these may possibly advantageously be combined, and the inclusion of two features in different claims does not imply that a combination of those features is not feasible and/or advantageous.

In addition, singular references do not exclude a plurality. The terms "a", "an", "first", "second" etc. do not preclude a plurality.

EXAMPLES

The following examples are mere examples and should by no means be interpreted to limit the scope of the invention, as the invention is limited only by the accompanying claims.

General

Figure 3:
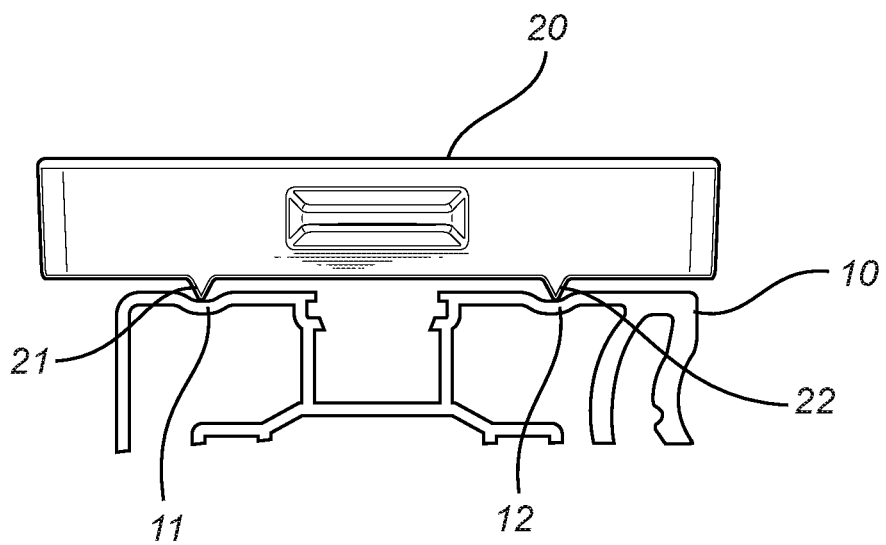
FIG. 3 depicts a cross section of a sliding system used for friction tests.
Figure 4:
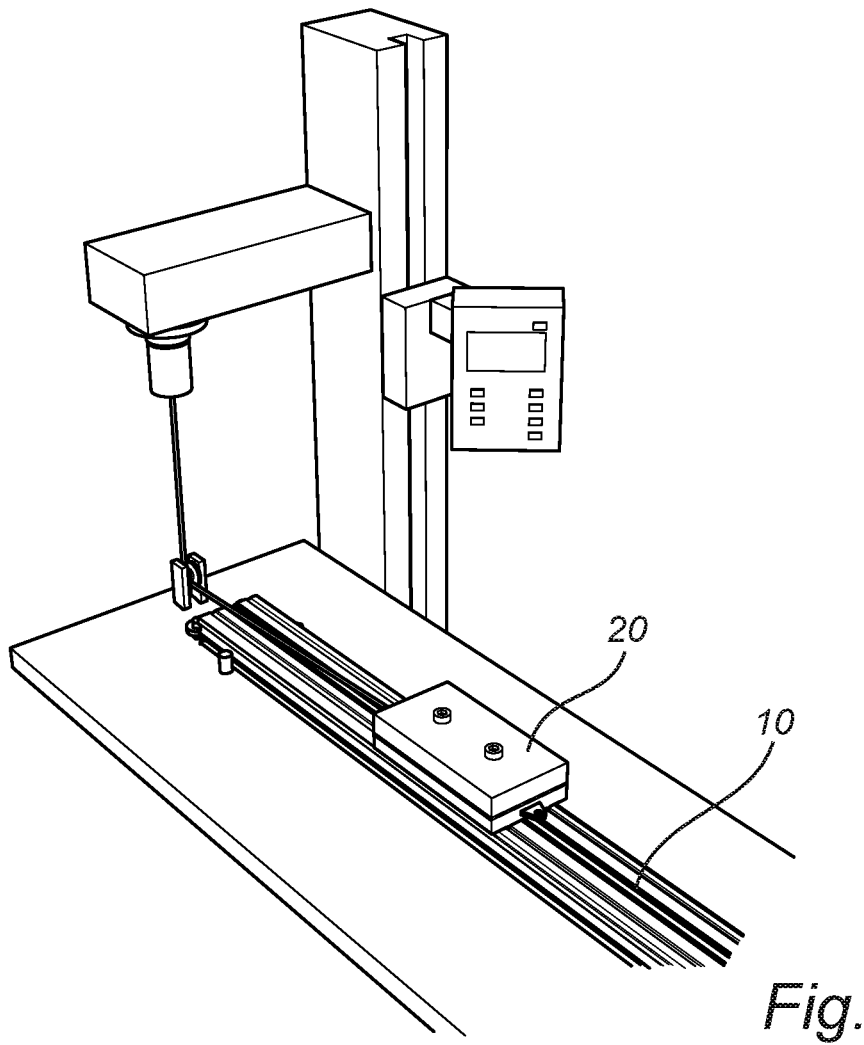
FIG. 4 illustrates an arrangement for performing friction tests with the sliding system of FIG. 3.

All chemicals were obtained from Sigma-Aldrich Sweden AB, Stockholm, Sweden. The test procedure used was based on SS-EN 14882:205. In short, a sled with parallel plastic blades (four in total; two along each longitudinal slide axis) of POM was positioned on an anodized aluminum profile (cf. FIG. 3) having been anaphoretically coated with an acrylic resin and subsequently heat cured to provide a lacquered slide surface. Aluminum profiles lacquered in this way are for example provided by Sapa Profiler AB, 574 38 Vetlanda, Sweden, and are marketed under the trade name SAPA HM-white, the materials being produced using the Sapa HM-white method which is based on the above referenced Honny method. In the friction measurements, the sled was pulled over the slide bar at a constant speed of 500 mm/min and the force necessary to pull the sled was registered using an Instron 5966 tension testing system (cf. FIG. 4). The total weight of the sled corresponds to 10 N. Fresh profiles were used for each lipophilic composition, as the lipophilic compositions cannot be completely removed once applied.

Cleaning of the profiles was conducted by wiping the profile coated with the lipophilic composition 6 times with a wet cloth, and then 4 times with a dry cloth.

Ageing of the profiles was performed by putting the fresh profile, with lipophilic composition applied thereon, in an oven at 85° C. for 6 weeks. This corresponds to about 10 years of ageing at room temperature (20° C.). The profiles for ageing were put in the oven without any prior cleaning.

Example 1

By using the test procedure described above, the resulting friction from application of various lipophilic compositions to anodized, lacquered aluminum profiles was determined—before and after ageing corresponding to 10 year of use at room temperature. The resulting dynamic friction (mean value from three test sequences) was registered and compared to the dynamic friction for anodized aluminum profiles provided with a lacquer but not coated with any lipophilic composition (=control). The results are provided in Table 1 below.

TABLE 1

| Mixture/Chemicals (wt %) | Fresh guide | Cleaned guide | Aged guide |
| --- | --- | --- | --- |
| Ctrl (no lubricant) | 0.21 | | |
| Liquid paraffin 100% | 0.053 | 0.046 | 0.068 |
| Liquid paraffin 99.8%, and Vitamin E 0.2% | 0.052 | 0.044 | 0.054 |
| Liquid paraffin 83.1%, Coconut oil 16.7%, and Vitamin E 0.2% | 0.043 | | 0.046 |

TABLE 1-continued

| Mixture/Chemicals (wt %) | Fresh guide | Cleaned guide | Aged guide |
| --- | --- | --- | --- |
| Hexadecane 83.1%, Lauric acid 16.7%, and Vitamin E 0.2% | 0.080 | | |
| Hexadecane 100% | 0.085 | | |
| Coconut oil 100% | 0.033 | 0.034 | 0.15 |
| Tripalmitate 10%, and Liquid paraffin 90% | 0.046 | | 0.079 |
| Lauric acid 100% | 0.086 | | 0.18 |

As can be seen from Table 1, the resulting dynamic friction was reduced by about 75% by applying a lipophilic composition to the anodized aluminum profiles, though the initial dynamic friction of the un-coated anodized aluminum profiles was not that high. Seemingly, tri-glycerides, either on their own or when as additives provide the lowest dynamic friction. Further, lubricants comprising fatty acids or fatty acids residues (i.e. tri-glycerides) were less ageing resistant compared to, e.g. liquid paraffin. While addition of an anti-oxidant significantly improved the ageing resistance of tri-glycerides, fatty acids remained ageing sensitive.

Furthermore, whereas the dynamic friction remained low and nearly the same for the coated profiles over repeated cycles, the dynamic friction for un-coated anodized aluminum profiles was significantly increased (seizing) already after less than 20 test cycles.

Example 2

Tests were also performed in a test rig to simulate a full scale wardrobe door with a weight of 5 kg. A weight of 5 kg was put on a sled 20 of the type illustrated in FIG. 3 and the sled was made to move back and forth in a reciprocating movement on a slide bar 10 of the type described hereinabove with reference to FIG. 3. The slide bar 10 was provided with a furniture lubricant, also tested for friction, see table 1, and comprising: liquid paraffin 83.1%, coconut oil 16.7%, and vitamin E 0.2%. The furniture lubricant had a viscosity, according to ISO 3104:1994/COR 1:1997, at 40° C., being 45 mm$^2$/s. After having been reciprocated 30 000 times the sled did not show any sign of wear, and neither did the slide bar. The force required to reciprocate the sled did, after a run-in period during the first 500 cycles, not change substantially during the following 29 500 cycles and the force was, during all of the 30 000 cycles, well within the requirements for a wardrobe door. In a comparative test under similar conditions, no lipophilic composition coating was applied on the lacquer of the slide bar. In the latter case the tests had to be stopped already after less than 30 cycles due to rapidly increasing friction between the sliding member and the slide bar (seizing).

The invention claimed is:

1. A lacquered furniture slide bar having a furniture lubricant coated thereupon to provide a slide layer with lowered friction for a least one plastic furniture sliding member on the furniture slide bar, the interface between the slide layer of the furniture slide bar and the sliding member forming a linear plain bearing to allow for movement of the sliding member along the furniture slide bar, wherein the furniture lubricant comprises at least about 70 wt % of a mixture of at least two different C10 to C28 alkanes, about 10-30 wt % of a mixture of at least two different tri-glycerides, and an anti-oxidant, the viscosity, according to ISO 3104:1994/Cor 1: 997, of the furniture lubricant at 40° C. being 20 to 80 mm$^2$/s.

2. The lacquered furniture slide bar according to claim 1, wherein the anti-oxidant is selected from the group consisting of tocopherols and sterically hindered phenols.

3. The lacquered furniture slide bar according to claim 1, wherein the furniture lubricant comprises less than 5 wt. % aromatics.

4. The lacquered furniture slide bar according to claim 1, wherein the furniture lubricant has Total Iodine Value according to ASTM D1541-97 of less than 10.

5. The lacquered furniture slide bar according to claim 1, wherein the furniture lubricant is present in liquid form at least at temperatures of 15° C. and above.

6. The lacquered furniture slide bar according to claim 1, wherein each of the components in the furniture lubricant at least fulfill one of the following criteria:

was generally recognized as safe (GRAS) in the US on Dec. 31, 2016;

was classified as a HI lubricant by NSF on 31 Dec. 2016; and was approved for contact with food according to the EU Regulation (EC) No 1935/2004 on 31 Dec. 2016.

7. The lacquered furniture slide bar according to claim 1, wherein the mixture of at least two different tri-glycerides was generally recognized as safe (GRAS) in the US on Dec. 31, 2016.

8. The lacquered furniture slide bar according to claim 1, wherein the pour point of the furniture lubricant according to ISO 3016:1994 is 20° C. or less.

9. The lacquered furniture slide bar according to claim 1, wherein the furniture lubricant comprises liquid paraffin and a biologically derived triglyceride composition.

10. The lacquered furniture slide bar according to claim 1, wherein the viscosity, according to ISO 3104: 1994/COR 1:1997, of the furniture lubricant at 40° C. is 30 to 70 mm$^2$/s.

11. The lacquered furniture slide bar according to claim 1, wherein the furniture lubricant comprises 0.1 to 1 wt. % of the anti-oxidant.

12. The lacquered furniture slide bar according to claim 7, wherein all components in the furniture lubricant were generally recognized as safe (GRAS) in the US on Dec. 31, 2016.

13. The lacquered furniture slide bar according to claim 10, wherein the mixture of at least two different alkanes comprises liquid paraffin, and the mixture of at least two different tri-glycerides comprises coconut oil.

14. The lacquered furniture slide bar according to claim 1, wherein a plastic furniture sliding member is arranged in contact with the slide layer of the furniture slide bar to allow for movement of the sliding member along the furniture slide bar, whereby a furniture linear plain bearing is provided.

* * * * *